(No Model.) 2 Sheets—Sheet 1.
G. A. DEAN.
BOSHING APPARATUS.
No. 561,570. Patented June 9, 1896.
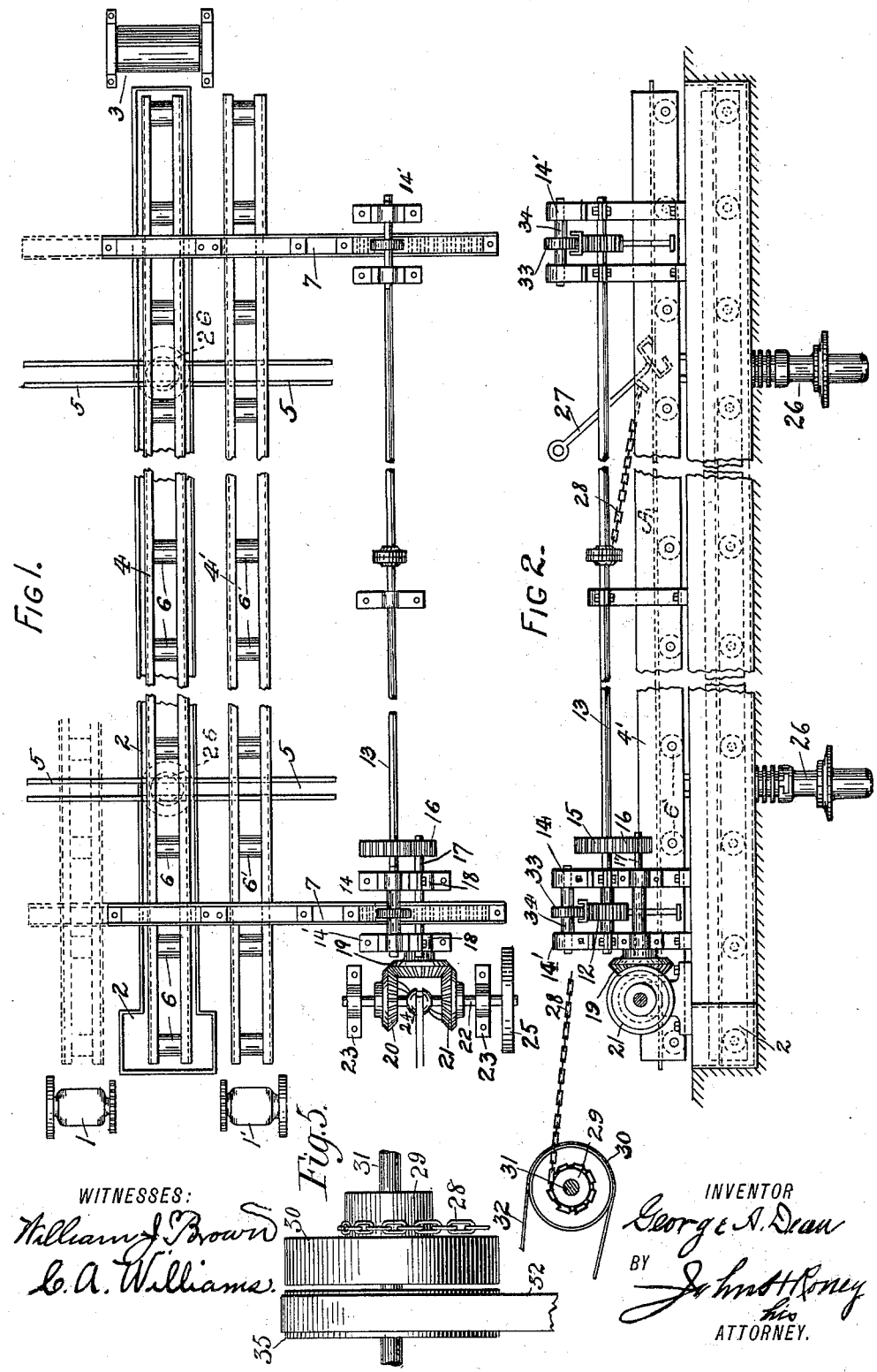
WITNESSES:
William J Brown
C. A. Williams
INVENTOR
George A. Dean
BY
John H Roney
his ATTORNEY.

(No Model.) 2 Sheets—Sheet 2.
G. A. DEAN.
BOSHING APPARATUS.
No. 561,570. Patented June 9, 1896.
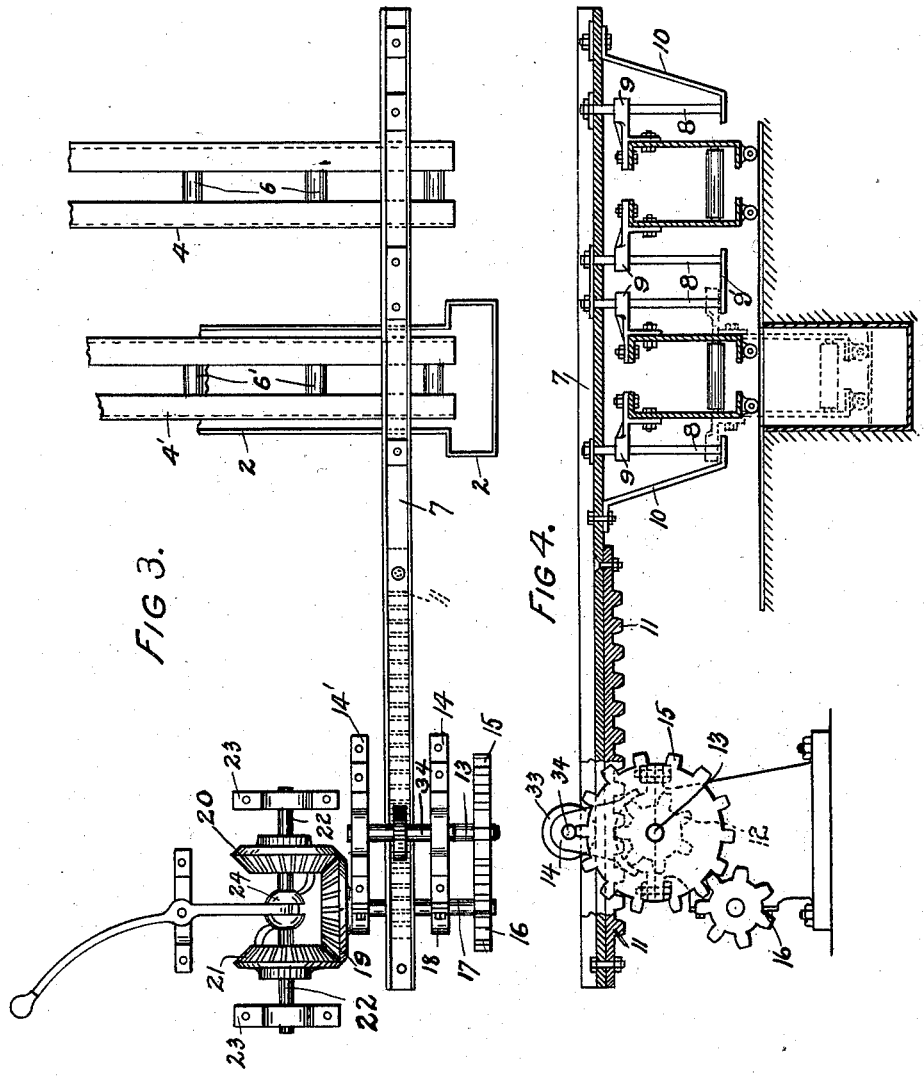
WITNESSES:
William J Brown
C. A. Williams.
INVENTOR
George A Dean
BY
John H Roney
ATTORNEY.

UNITED STATES PATENT OFFICE.

GEORGE A. DEAN, OF MINGO JUNCTION, OHIO.

BOSHING APPARATUS.

SPECIFICATION forming part of Letters Patent No. 561,570, dated June 9, 1896.

Application filed November 13, 1895. Serial No. 568,803. (No model.)

*To all whom it may concern:*

Be it known that I, GEORGE A. DEAN, a citizen of the United States, residing at Mingo Junction, in the county of Jefferson and State of Ohio, have invented certain new and useful Improvements in Apparatus for Conveying, &c., Large Tonnage of Plate for Tin and Terne in Bosh; and I do hereby declare the following to be a full, clear, and exact description of the invention, such as will enable others skilled in the art to which it pertains to make and use the same, reference being had to the accompanying drawings, which form a part of this specification, in which—

Figure 1 indicates a plan view of my improved apparatus for conveying to and maintaining plate in a bosh. Fig. 2 is a side elevation of the same. Fig. 3 is an enlarged view of the clutch mechanism, rack-bar, carriages connected thereto, and means of operating the same. Fig. 4 is a side elevation of cogs meshing with rack-bars; also sectional end view showing manner of connecting carriages. Fig. 5 is a plan view of shaft 31 and pulleys thereon.

Heretofore, so far as I am aware, it has been impossible to handle or convey large tonnage of bars intended for the manufacture of tin and terne to the bosh, and to manipulate the same therein without causing buckling or bending up.

The object of my invention is, first, to produce an apparatus for conveying large tonnage of plate or sheet, especially intended for the manufacture of tin and terne plate, to the bosh, and maintaining the same therein in such manner as to prevent the before-mentioned buckling or bending; second, the production of an apparatus by the use of which the operations of rolling the plates or sheets, boshing, and shearing the same is performed substantially without interruption, heretofore unavoidable—that is to say, the rolls, bosh-tank, and shears are arranged in such manner with relation to the carriages which convey the plates or sheets from the rolls to the shears and support the plates or sheets while being boshed that during the time either of said carriages is opposite the rolls receiving plates or sheets and with its contents in the bosh-tank the other carriage is opposite one of the shears and the plates or sheets thereon being reduced to suitable lengths, whereby, as before stated, the threefold operation of rolling, boshing, and shearing is practically continuous, thus economizing time and labor and greatly increasing the product of the mill.

I will now describe my invention, reference being had to the accompanying drawings, forming part hereof, in which like letters and figures indicate like parts wherever they occur.

Referring to said drawings, 1 and 1' indicate, respectively, shears located at one end and on each side of a bosh-tank 2, and adapted to be operated in any usual manner. At the opposite end of said bosh-tank and immediately opposite the end thereof are located finishing-rolls 3, which likewise may be driven in any usual manner.

4 and 4' are carriages mounted on wheels and adapted to be moved on ways or tracks 5 5, as hereinafter specified, whereby long bars A for tin and terne plate, when passed through and finished on said rolls 3, are received and supported upon a series of rollers 6 and 6', respectively, journaled in the sides of said carriages 4 and 4', respectively, and after being boshed, as hereinafter specified, conveyed to the shears 1 and 1', respectively, for the purpose of being cut into suitable lengths. Said carriages are, as heretofore stated, mounted on ways or tracks and are capable of being moved laterally thereon simultaneously by bars 7 7, to the inner ends, respectively, of which are bolted or otherwise suitably secured the rods 8 8, which project downwardly therefrom on each side of the carriages parallel with the sides thereof through orifices formed in lugs 9 9, which are bolted upon the top of the sides of said carriages and project at right angles therefrom, as shown in Fig. 4. The lower ends of the rods 8 8, which project downwardly between the carriages, are connected by bars 9', the rods 8 on the opposite side, respectively, of said carriages being made rigid and firm by the brace-bars 10 10, the ends of which, respectively, are secured to the lower ends of said rods 8 and to bars 7 7, as shown in Fig. 4. The rods 8 8 fit loosely in holes formed in the lugs 9 9 to permit either of said carriages when being lowered into the bosh-tank and elevated therefrom to slide freely on said rods, whereby either of said carriages with the plate thereon can be lowered into the bosh-tank (when immediately over the same) by the hydraulic lifts, as hereinafter specified, without being disconnected or uncoupled from the other, as shown in Fig. 4, and also to admit of said carriages being, when out of the bosh-tank and on the same horizontal plane, moved laterally simultaneously, as hereinafter specified. The outer lower ends of said bars 7 7 are respectively provided with racks 11 11, which engage cogs 12 12, mounted on the shaft 13 between the standards 14 and 14', which carry bearings for said shaft. Said shaft is provided with a cog 15, which meshes with and receives power from a similar cog 16, mounted on the end of the horizontal shaft 17, which is journaled in bearings 18, formed in the standard 14. The end of said shaft opposite that on which the cog 16 is mounted is provided with a bevel or miter wheel 19, adapted to mesh with and receive power alternately from the miter-wheels 20 and 21, which are loosely mounted on the shaft 22, which is journaled in bearings formed in the standards 23, accordingly as either of said wheels 20 21 are rigidly secured on said shaft 22 by the clutch 24, located on said shaft 22 between said bevel-wheels 20 and 21, loosely secured thereon, whereby power transmitted through the belt-pulley 25, mounted on said shaft 22, transmits power thereto, and to whichever said miter-wheels 20 or 21 are made rigid on said shaft by said clutch, thence to the beveled wheel 19 and the cog 16, thence to the large cog 15, mounted on shaft 13, and to the cogs 12 12, mounted on said shaft, which mesh with the racks 11 11 on the ends of said bars 7 7, respectively, whereby said carriages are moved from and toward the bosh alternately, accordingly as either said beveled wheels 20 21 are fixed rigid upon said shaft 22, whereby the carriages are moved alternately into a position opposite the rolls and over the bosh-tank, and are adapted to be lowered when in such position into said tank by the hydraulic lifts 26 26, located in the bottom of the same without being disconnected from the other carriage, then opposite one of the pairs of shears, being coupled, as heretofore stated, in the manner shown in Fig. 4, to admit of this.

27 is a pair of tongs connected to the chain 28, adapted to be coiled around a drum or spool 29, which projects from the side and is integral with the loose pulley 30 on shaft 31, whereby when power is applied to the belt 32 the bar or sheet seized by said tongs is caused to move toward and into the jaws of the shears and cut into suitable lengths.

33 33 are small rolls mounted on the short shafts 34, journaled in the top of the standards 14 and 14' and impinges upon the top of the rack-bars immediately above the cog-wheel which engages the rack on the under side of the same for the purpose of guiding said rack-bars and maintaining the same in mesh with the cogs.

The shaft 31, on which is mounted the loose pulley 30, is provided with a pulley 35, rigidly secured upon the same for the purpose of enabling the belt 32 to be shifted from said pulley 30 to the pulley 35 when it is necessary to uncoil the chain after each successive sheet has been sheared, and to enable another sheet, resting on either of the carriages, to be seized by the tongs, as shown in Fig. 2.

The operation of my device is as follows, viz: The carriages standing in the position shown in Fig. 1, carriage 4, being opposite the rolls and over the bosh-tank, is loaded with plates or sheets from said rolls lowered into the bosh, as heretofore described, elevated therefrom, and, the bevel-wheel 20 being thrown in clutch with the miter or bevel wheel 19, power applied to the belt-pulley in any usual manner moves the rack-bars and the carriages connected therewith and coupled together by the rods which project downwardly therefrom through openings in lugs secured to the top of the sides of said carriages in the direction of shears 1, thus bringing the carriage 4 opposite shears 1, as indicated by dotted lines, Fig. 1, and carriage 4' into the position just vacated by carriage 4. Carriage 4' is loaded with plates or sheets, as heretofore specified, and lowered into the bosh-tank. The contents of carriage 4 meanwhile being sheared carriage 4' is raised out of the tank and the mechanism which operates the rack-bars reversed, causing the carriages to be moved into their original position, carriage 4', however, being loaded with sheets or plates to be cut into suitable lengths by shears 1', and this operation is continued successively without interruption.

Having described my invention, what I claim, and desire to secure by Letters Patent, is—

1. In an apparatus for conveying large tonnage to bosh and maintaining the same therein, the combination of two or more carriages coupled together and adapted to be moved laterally simultaneously; each of said carriages having a series of rollers mounted in the sides thereof, the carriages being coupled together in such manner that either of them can be lowered or dropped below the plane of the other without being uncoupled or disconnected; means to move said carriages; a bosh-tank, and a hydraulic lift or lifts, substantially as described.

2. In an apparatus for conveying large tonnage to bosh and maintaining the same therein, the combination of two or more carriages coupled together and adapted to be moved laterally simultaneously; each of said carriages having a series of rollers mounted in the sides thereof, the carriages being coupled together in such manner that either of them can be lowered or dropped below the plane of the other without being uncoupled or disconnected; means to move said carriages; a bosh-tank; a hydraulic lift or lifts, and means to feed the plates carried by said carriage when boshed into the shears, substantially as described.

3. In an apparatus for conveying large tonnage to bosh and maintaining the same therein, the combination of two or more carriages coupled together, each of said carriages carrying a series of rollers; rack-bars connected with and coupling said carriages; means to move or reciprocate said rack-bars alternately backward and forward; a bosh-tank adapted to receive said carriages and contents; and a hydraulic lift or lifts; and means to feed the plates carried by said carriages when boshed into the shears, substantially as described.

4. In an apparatus substantially as described, the combination of a bosh-tank, a pair of shears at each side the same at one end; finishing-rolls immediately opposite the same at the opposite end; two carriages coupled together in a manner to enable either of the same to be dropped below the horizontal plane of the other, and adapted to be moved laterally simultaneously; each of said carriages having a series of rollers mounted in the sides thereof; means to move said carriages; a hydraulic lift or lifts, and means to feed the plate carried by said carriages when boshed into the shears.

In testimony that I claim the foregoing I hereunto affix my signature this 9th day of November, A. D. 1895.

GEORGE A. DEAN. [L. S.]

In presence of—
MARY M. HEDDEN,
C. A. WILLIAMS.